United States Patent
Claussen et al.

(10) Patent No.: US 7,212,579 B2
(45) Date of Patent: May 1, 2007

(54) RADIO TELECOMMUNICATIONS RECEIVER OPERATIVE TO RECEIVE DIGITAL DATA SYMBOLS OR BITS BY ITERATIVE DETERMINATION OF SOFT ESTIMATES, AND A CORRESPONDING METHOD

(75) Inventors: Holger Claussen, Swindon (GB); Hamid Reza Karimi, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 845 days.

(21) Appl. No.: 10/366,788

(22) Filed: Feb. 14, 2003

(65) Prior Publication Data
US 2003/0154435 A1    Aug. 14, 2003

(30) Foreign Application Priority Data
Feb. 14, 2002   (EP)   ................................. 02251014

(51) Int. Cl.
*H04B 7/02* (2006.01)
(52) U.S. Cl. ................ 375/267; 375/340; 375/347; 375/341; 714/146; 714/788; 714/795; 714/755; 455/130
(58) Field of Classification Search ................ 714/146, 714/788, 795, 755; 375/267, 340, 347, 341; 455/130
See application file for complete search history.

(56) References Cited
U.S. PATENT DOCUMENTS

| 4,596,024 | A   | * | 6/1986  | Thomson ................... 375/347 |
| 5,446,747 | A   | * | 8/1995  | Berrou ........................ 714/788 |
| 6,360,345 | B1  | * | 3/2002  | Kim et al. ................... 714/746 |
| 6,581,182 | B1  | * | 6/2003  | Lee ............................. 714/795 |
| 6,876,709 | B1  | * | 4/2005  | Kim et al. ................... 375/341 |
| 2004/0038653 | A1 | * | 2/2004 | Claussen et al. ............ 455/130 |
| 2005/0031053 | A1 | * | 2/2005 | Claussen et al. ............ 375/340 |
| 2005/0157811 | A1 | * | 7/2005 | Bjerke et al. ............... 375/267 |

FOREIGN PATENT DOCUMENTS
WO        WO 01/69873 A2  *  9/2001

OTHER PUBLICATIONS

Fazel, K. "Interactive Decoding of Generalized Concatenated Blokh-Zyablov-Codes" 1996 IEEE International Conference on Communications (ICC). Converging Technologies for Tomorrow's Applications. Dallas, Jun. 23-27, 1996, IEEE International Conference on Communications (ICC), New York, IEEE, U.S. vol. 1, Jun. 23, 1996, pp. 96-101, XP000625649 ISBN: 0-7803-3251-2.

(Continued)

*Primary Examiner*—Chieh M. Fan
*Assistant Examiner*—Sudhanshu C. Pathak

(57) ABSTRACT

A radio telecommunications receiver operates to receive digital data symbols or bits by iterative determination of soft estimates of symbols or bits followed by a hard decision as to what symbol or bit was intended. The receiver comprises a first processor operative to provide first soft estimates of symbols or bits of the received signal and a second processor operative to decode the first soft estimates and to provide second soft estimates of the symbols or bits. The receiver also comprises a combiner operative to provide third soft estimates back to the first processor for subsequent further decoding, the third soft estimates of each symbol or bit being dependent upon the respective second soft estimate and a respective previous second soft estimate.

8 Claims, 6 Drawing Sheets

Soft Value Combining For Turbo Decoding

OTHER PUBLICATIONS

Qin, Z. et al: Interactive Multiuser Detection for Serially Concatenated Convolutionally Coded Asychronous "CDMA", Electronics Letters, IEE Stevenage, GB, vol. 36, No. 10, May 11, 2000, pp. 898-899, XP006015229 ISSN: 0013-5194.

Wang, X. et al: "Interactive (Turbo) Soft Interference Cancellation and Decoding for Coded CDMA" IEEE Transactions on Communications, IEEE Inc., New York, U.S., vol. 47, No. 7, Jul. 1999, pp. 1046-1061, XP000849079 ISSN: 0090-6778.

Benedetto, S. et al: "Parallel Concatenated Trellis Coded Modulation", 1996 IEEE International Conference on Communications (ICC). Converging Technologies for Tomorrow's Applications. Dallas, Jun. 23-27, 1996, IEEE International Conference on Communications (ICC), New York, IEEE, U.S., vol. 2, Jun. 23, 1996, pp. 974-978, XP000625917 ISBN: 0-7803-3251-2.

P.S. Guinand, et al, "Serial Interference Cancellation for Highly Correlated Users", *IEEE Pacific Rim Conference*, (1999), pp. 133-136.

Babak Hassibi, "A Fast Square-Root Implementation for BLAST", *Record of the 34th Asilomar Conference*, vol. 2, (2000), pp. 1255-1259.

Xiaodong Li, et al, "*Effects of Iterative Detection and Decoding on the Performance of BLAST*", *GLOBECOM '00, IEEE*, vol. 2 (2000), pp. 1061-1066.

S. Benedetto, et al, "A Soft-Input Soft-Output APP Module for Iterative Decoding of Concatenated Codes", *IEEE Communications Letters*, vol. 1, Issue 1, (Jan. 1997), pp. 22-24.

\* cited by examiner

Successive Interference Cancellation Overview For First Iteration

Fig. 3 Performance of symbol-based Iterative SIC detectors

Fig. 4 Performance of bit-based Iterative SIC detectors

Soft Value Combining For Turbo Decoding

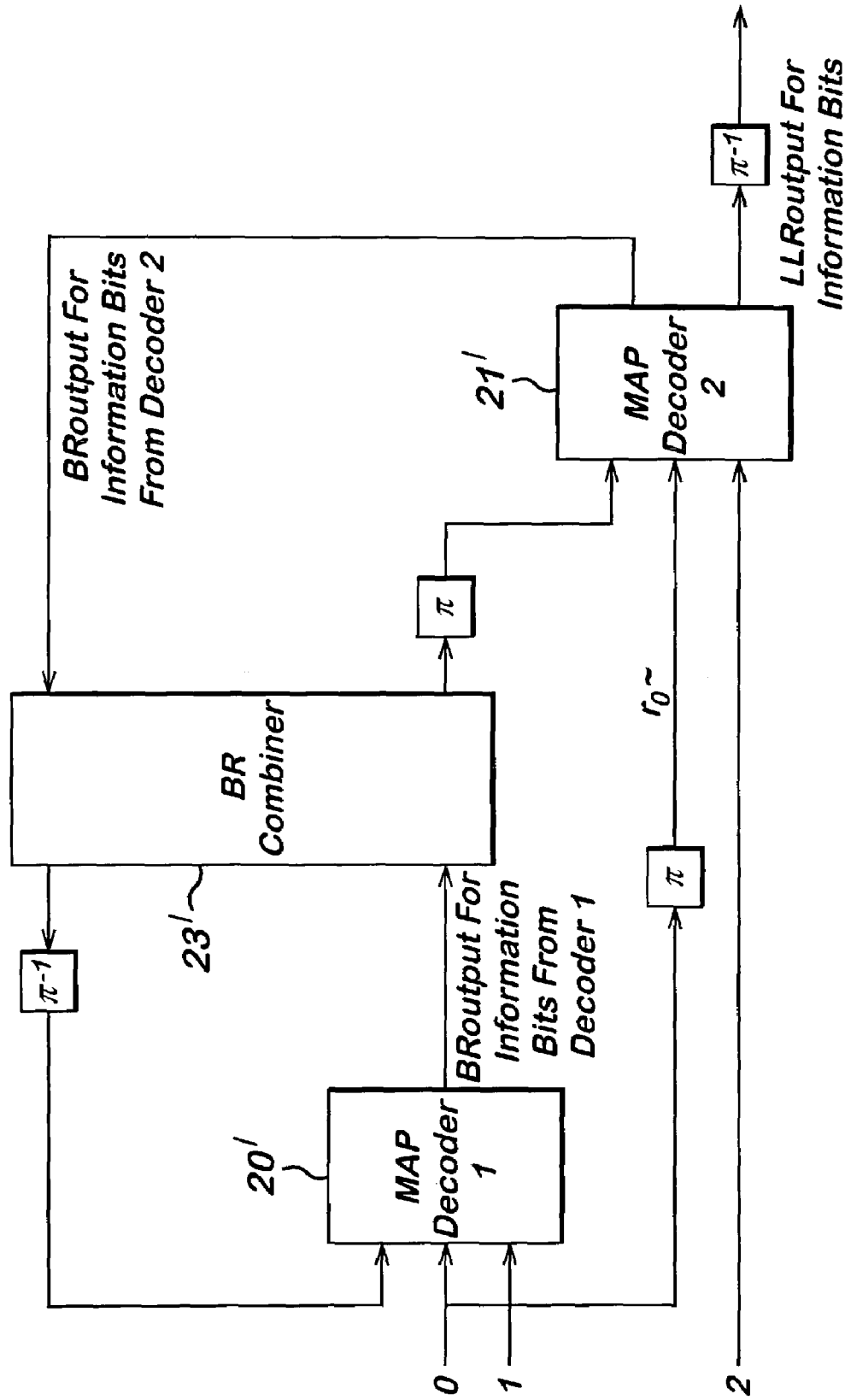

RADIO TELECOMMUNICATIONS RECEIVER OPERATIVE TO RECEIVE DIGITAL DATA SYMBOLS OR BITS BY ITERATIVE DETERMINATION OF SOFT ESTIMATES, AND A CORRESPONDING METHOD

CROSS REFERENCE TO RELATED APPLICATION

This application claims priority of European Application No. 02251014.3 filed on Feb. 14, 2002.

BACKGROUND OF THE INVENTION

1. Technical Field

The present invention relates to radio telecommunications; in particular to, receiving digital data symbols or bits by iterative determination of soft estimates of symbols or bits followed by a hard decision as to what symbol or bit was intended.

2. Description of the Related Art

In an iterative radio receiver which involves mutual information exchange between a detector and a decoder (or two decoders), at each iteration, soft estimates (e.g. log-likelihood ratios, LLR) at the output of the decoder are fed back to the detector (or other decoder) for purposes of interference cancellation. As a result, new and hopefully more reliable soft estimates are made available at the output of the decoder after each iteration process.

However in some cases, the interference cancellation process can lead to poorer soft estimates values for certain bits. This can result in error propagation due to incorrect interference cancellation and therefore lead to unstable bit-error rate performance in the following iterations.

One type of detector or decoder is a multiple-input multiple-output MIMO successive interference cancellation SIC detector; another is a turbo decoder.

In MIMO (multiple-input multiple-output) systems, the reuse of the spreading codes leads to high multiple access interference. Successive interference cancellation (SIC) is a well known technique to reduce the multiple access interference in both detectors for single input-single output (SISO), and multiple-input multiple-output (MIMO) systems such as minimum mean squared error MMSE detectors used in (Bell Laboratories layered space time) BLAST™ type receivers.

Successive interference cancellation techniques of symbol based detection reduce the multiple access interference by cancelling already detected users or data streams from the received signal, see for example Guinand, P. S.; Kerr, R. W.; Moher, M., "Serial interference cancellation for highly correlated users", Communications, Computers and Signal Processing, 1999IEEE Pacific Rim Conference on, pages: 133–136. This is especially important for MIMO systems, where the spreading code reuse leads to high multiple access interference.

As order metric, the least mean-square error (LMSE) criterion, which finds application in minimum mean squared error MMSE detectors is used, as described in Hassibi, B. "A fast square-root implementation for BLAST", Signals, Systems and Computers, 2000 Conference Record of the Thirty-Fourth Asilomar Conference, Volume: 2, 2000 pages 1255–1259 vol. 2.

In combination with iterative detection and convolutional decoding the performance of such detectors can be improved to some extent, as described in Li, X.; Huang, H.; Foschini, G. J.; Valenzuela, R. A., "Effects of iterative detection and decoding on the performance of BLAST", Global Telecommunications Conference, 2000. GLOBECOM '00. IEEE, Vol. 2, 2000, pages: 1061–1066vol. 2.

A known type of MIMO detector is a posteriori probability (APP) detector which generates the log likelihood ratios of the received symbols. It performs an exhaustive search through the transmitted symbol candidates and determines the best vector that matches the received symbols. The APP detector is described in Benedetto, S.; Divsaler, D.; Montorsi, G.; Pollara, F., "A soft-input soft-output APP module for iterative decoding of concatenated codes" IEEE Communications Letters, Volume: 1 Issue: 1, Jan. 1997 Page(s): 22–24.

SUMMARY OF THE INVENTION

An embodiment of the present invention provides a radio telecommunications receiver operative to receive digital data symbols or bits by iterative determination of soft estimates of symbols or bits followed by a hard decision as to what symbol or bit was intended. A first processor provides first soft estimates of symbols or bits of the received signal, and a second processor decodes the first soft estimates to provide second soft estimates of the symbols or bits. A combiner provides third soft estimates back to the first processor for subsequent further decoding, the third soft estimates of each symbol or bit are dependent upon the second soft estimate and a previous second soft estimate. A plurality of iterations each involving the first processor, second processor and combiner are performed whereupon a hard decision is made as to what symbol or bit was intended.

The first processor may be a detector or decoder. In one embodiment, the first processor may be a successive interference cancellation SIC multiple input multiple output MIMO detector and the second decoder may be a convolutional decoder, the soft estimates being log likelihood ratios.

Preferably the SIC MIMO detector undertakes detection on a per-bit basis by successive interference cancellation. In preferred embodiments, the optimal order for successive cancellation in combination with QPSK or higher modulations can be achieved using bit-based detection. For bit-based detection, the modulation is transformed to binary phase shift keying BPSK, so that one transmitted bit corresponds to one unique signature. Then the detection and cancellation can be ordered independently according to the error probability of each bit. Bit-based detection makes optimal detection order possible particularly for higher-order modulation schemes e.g 16 Quadrature amplitude modulation.

Preferably, in use, the soft estimates of multiple data streams which are multiplexed into one stream at the output of the SIC MIMO detector, are deinterleaved by a deinterleaver before being passed to the convolutional decoder and the third soft estimates provided by the combiner are interleaved by an interleaver before being passed back to the SIC MIMO detector.

Alternatively preferably the first processor is a convolutional decoder, turbo-decoder, MAP decoder or decoder of concatenated codes, the second processor is a convolutional decoder, turbo-decoder, MAP decoder or decoder of concatenated codes, the soft estimates being extrinsic information values.

A preferred receiver comprises a second combiner operative to provide adapted first soft estimates to the second processor, the adapted first soft estimates of each symbol being dependent upon the respective first soft estimate and a respective previous first soft estimate. Furthermore, preferably the output of the first combiner is deinterleaved then provided to the first processor and the output of the second combiner is interleaved then provided to the second processor.

Alternatively preferably the one combiner is also operative to provide adapted first soft estimates to the second processor, the adapted first soft estimates of each symbol or bit being dependent upon the respective first soft estimate and respective previous soft estimate. Furthermore, preferably the output from the combiner of adapted first soft estimates are interleaved and the output from the combiner of third soft estimates are deinterleaved.

Preferably the or each combiner includes a store to store the previous soft estimates.

The present invention also provides a method of receiving digital data symbols or bits in a radio telecommunications receiver by iterative determination of soft estimates of symbols or bits followed by a hard decision as to what symbol or bit was intended, the method comprising the steps of processing the received signal by a first processor to provide first soft estimates of symbols or bits of the received signal, decoding by a second processor by using the first soft estimates to provide second soft estimates of the symbols or bits, producing third soft estimates dependent upon the respective second soft estimate and a respective previous second soft estimate of each symbol or bit, and providing the third soft estimates back to the first processor for subsequent further decoding.

In preferred radio receivers which involve iterations between a detector and a decoder, the quality of the soft estimates at the output of the decoder (i.e. log-likelihood ratios, LLR) can thus be improved by combining the soft estimate values from the current iteration with those of the previous iteration. Using this combining process, reliability information of some bits already gained from the previous iteration is not lost and is used to improve the quality of the soft estimates produced in a current iteration. Unstable bit-error rate performance due to the poor quality of soft estimate values of certain bits at the output of the decoder can thus be avoided.

BRIEF DESCRIPTION OF THE DRAWINGS

Preferred embodiments of the present invention will now be described by way of example and with reference to the drawings, in which:

FIG. 6 is a modified turbo decoder according to the present invention in a yet further embodiment.

DETAILED DESCRIPTION

Firstly, symbol- and bit-based successive iterative cancellation SIC MIMO detectors are considered based on matched filter (MF), minimum mean squared error MMSE, and a posteriori probability (APP) detection. Turbodecoders and other types of detectors and decoders are then considered.

System Architecture With a SIC MIMO Detector

Figure 1:
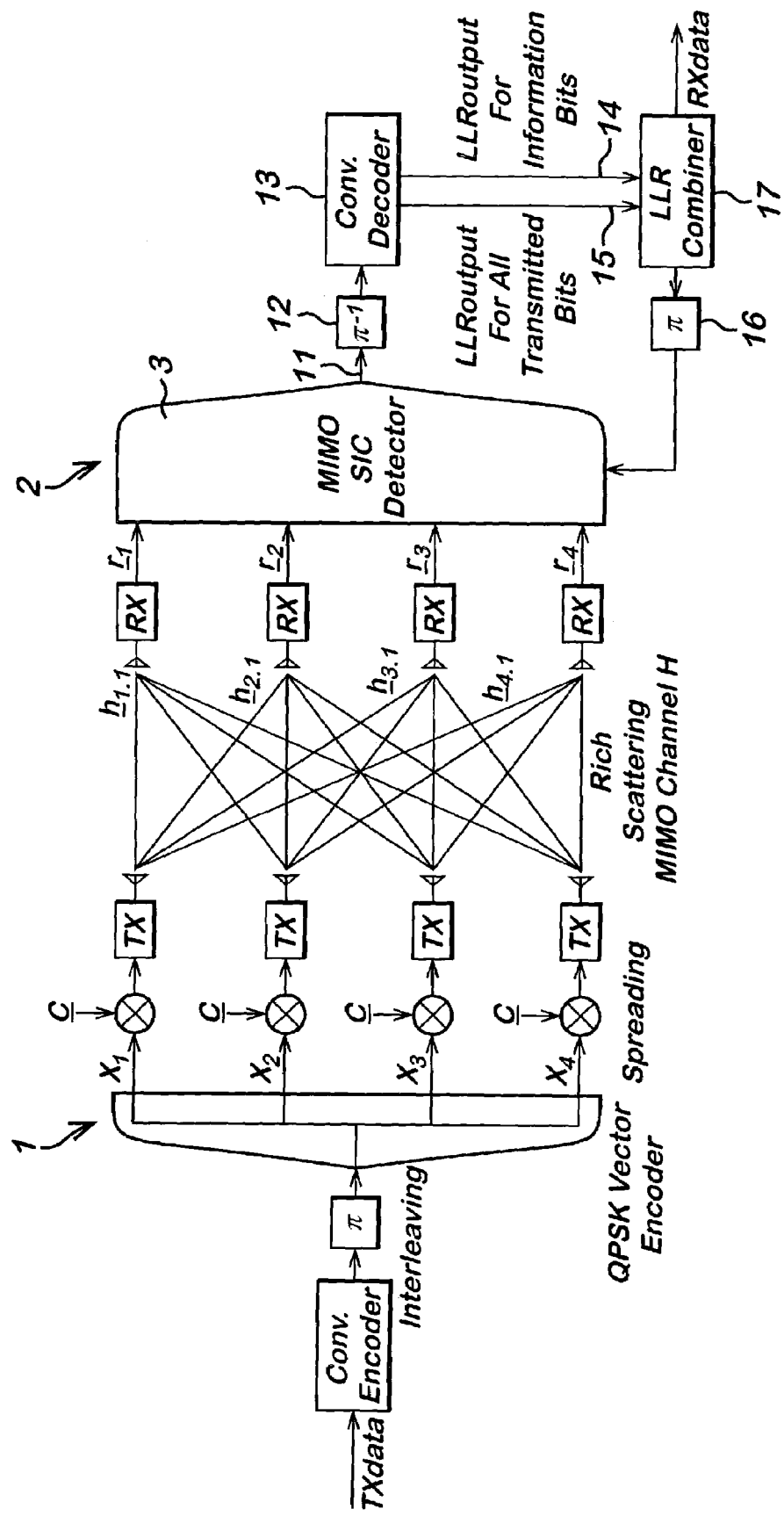
FIG. 1 is a diagrammatic illustration of a telecommunications transmitter and receiver including a receiver according to the present invention in a first embodiment including an SIC MIMO detector.

FIG. 1 shows a transmitter 1, and a receiver 2. The receiver 2 includes an iterative MIMO SIC detector 3. At the transmitter 1, the data for transmission is coded with a convolutional code and interleaved. The coded data stream is demultiplexed into $n_T$ substreams, each for one of the $n_T$ antennas of the transmitter. Then, the substreams are QPSK modulated and subsequently, spread with the same spreading code and transmitted from transmitting antennas TX. Therefore, only the propagation environment, which is assumed to exhibit significant multipath (so-called rich scattering) is exploited to achieve the signal separation at the receiver.

Figure 2:
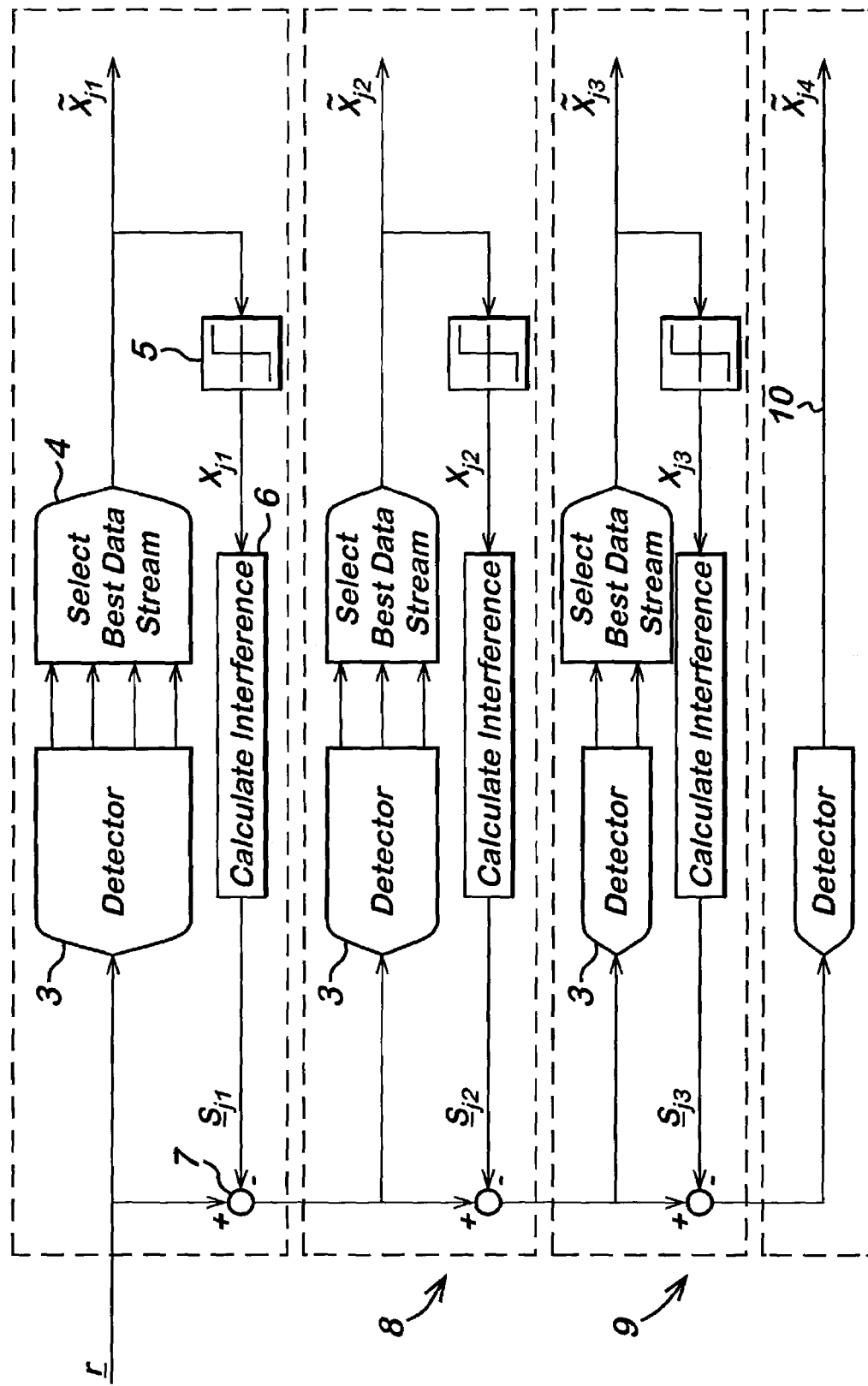
FIG. 2 is a diagrammatic illustration of operation of the receiver shown in FIG. 1 (and shows an overview of successive interference cancellation for a first iteration)

At the receiver 2, the transmitted bits are detected with a successive cancellation MIMO SIC detector 3 as shown in FIGS. 1 and 2, either based on matched filter, minimum mean squared error MMSE, or a posteriori probability APP detection as explained in more detail below.

As shown in FIG. 2, the received signal r, which contains all received signal vectors $r_k$ (k=1 . . . $n_R$) from the $n_R$ receiver antennas RX, is fed into the SIC MIMO detector 3 which detects all transmitted symbols $x_1 \ldots x_{n_T}$ and determines the most reliable data estimate according to the particular order metric used (as described in more detail below). Ideally, the data with lowest error probability is selected 4. The next step is to make a hard decision 5 on the symbol or bit of the selected data, and to reconstruct its interference 6 by, for each antenna, calculating what received signal would have produced a 1 or −1 decision exactly (without error). Finally, the interference is subtracted (step 7) from all received signals $r_k$.

When the decision on the selected symbol or bit was correct, its multiple access interference is cancelled completely, however a wrong decision doubles the interference of the detected symbol or bit. Therefore, the order metric is of crucial importance for the performance of successive cancellation detectors. In the first iteration, either of two order metrics for detection and cancellation of the received data streams are applied: ordering dependent on the least mean-squared error (LMSE) for symbol-based detection, which is used for minimum mean squared error MMSE BLAST, and the ordering dependent on the instantaneous error probabilities (IEP) within each symbol period, for bit-based detection. This detection and cancellation process is continued in repeated cycles 8, 9 until all data streams are detected.

Soft estimates are then generated and output by the SIC MIMO detector 3 as follows. After the detection of the whole interleaved sequence, all received data streams (soft outputs) are multiplexed to one data stream which is output 11 from the SIC MIMO detector for deinterleaving by deinterleaver 12 and decoding by convolutional decoder 13. The process of successive cancellation, deinterleaving and decoding represents the first iteration 14 of the iterative detector.

The subsequent iterations are based on the convolutional decoder 13 output of the whole transmitted sequence to improve the performance of the detector. Therefore, the decoder 13 output of all transmitted bits 15 is interleaved again by interleaver 16, and fed back to the successive cancellation detector 3. Now, the interleaved decoder output is used for the order calculation and cancellation at the detector 3. This improves the quality of the detector soft-outputs in each iteration, because the reliability of the decoder output is much higher than the initial estimates from say the matched filter or minimum mean squared error MMSE detector within the SIC MIMO detector 3. In each following iteration, log-likelihood ratio (LLR) combining in combiner is necessary to stabilize the decoder outputs. Log-likelihood ratios (LLRs) are, of course, the ratio of the probability that a bit is correct to the probability that it is not.

LLR Combining After Decoding

After the decoding in the second and all following iterations, new and hopefully more reliable LLR values are available. However in some cases, the new order and cancellation can lead to poorer results for some bits. This would if not dealt with result in incorrect order values for detection and cancellation and therefore to unstable bit-error rate results in the following iterations. However, by combining the current LLR values with the ones of the previous iteration in the LLR combiner 17 shown in FIG. 1, such instabilities are avoided. For that, each new LLR value $L_{bl}$ of bit b consists of a weighted sum of the current, and the previous LLR value. Example proportions are 85:15 current to previous, or 70:30 current to previous. The proportion of the current value has influence on the stability and the speed of convergence of the iterative detector. Using this combining process, already gained reliability knowledge of some bits is not lost in the next iteration, when the detection order has changed. This is performed for the LLR values of all transmitted bits.

Basically soft estimate combining improves and stabilizes the decoder outputs in an iterative receiver by using already available reliability information from the previous iteration.

Various Types of SIC MIMO Detectors

Successive iterative cancellation SIC MIMO detectors can be classified in two types: symbol-based and bit-based detectors. Either type can be a matched filter detector, a minimum mean squared error MMSE detector, or an a posteriori probability (APP) detector. Various options are discussed below.

Symbol-based Detectors

For symbol-based successive cancellation, whole symbols are always detected and cancelled. This disregards the influence of the transmitted data on the order, but is less complex than bit-based detection.

Whenever whole symbols are detected and cancelled, as in the case for successive cancellation based on the LMSE order, the signal vectors $r_k$, received at antenna k can be written as:

$$\begin{bmatrix} \underline{r}_1 \\ \underline{r}_2 \\ \vdots \\ \underline{r}_{n_R} \end{bmatrix} = \begin{bmatrix} \underline{s}_{1,1} & \underline{s}_{1,2} & \cdots & \underline{s}_{1,n_T} \\ \underline{s}_{2,1} & \underline{s}_{2,2} & \cdots & \underline{s}_{2,n_T} \\ \vdots & \vdots & \ddots & \vdots \\ \underline{s}_{n_R,1} & \underline{s}_{n_R,2} & \cdots & \underline{s}_{n_R,n_T} \end{bmatrix} \begin{bmatrix} x_1 \\ x_2 \\ \vdots \\ x_{n_T} \end{bmatrix} + \begin{bmatrix} \underline{n}_1 \\ \underline{n}_2 \\ \vdots \\ \underline{n}_{n_R} \end{bmatrix} \quad (1)$$

$$\underline{r} = S\underline{x} + \underline{n}$$

with: $\underline{x} = \underline{x}_R + j\underline{x}_I, \underline{x}_R, \underline{x}_I \in \{1,-1\}$ \quad (2)

$\underline{s}_{k,j} = H_{k,j} \underline{c}_j, H_{k,j} \in C^{(Q+W-1) \times Q}$ \quad (3).

where $s_{kj}$ is the signature, received at antenna k and transmitted by antenna j, and $x_j$ are the transmitted QPSK modulated symbols. Each symbol $x_j$ consists of two bits $x_{j,R}$ and $x_{j,I}$. The noise vectors, received at each antenna, are represented by $n_k$. $H_{k,j}$ denotes the convolution matrix of the channel between the transmitter antenna j and the receiver antenna k with W taps, and $c_j$ is the spreading code with spreading factor Q, transmitted by antenna j.

In the case that matched filter (MF) detection is used for the successive cancellation process, its output $y_{MF}$ is:

$$\underline{y}_{MF} = S^H \underline{r} = R\underline{x} + S^H \underline{n} \quad (4)$$

with: $R = S^H S$ \quad (5)

where R denotes the crosscorrelation matrix of the received signatures $S_{kj}$.

When the successive cancellation process is based on minimum mean squared error MMSE detection, the detector output $Y_{MMSE}$ is:

$$\underline{y}_{MMSE} = M^{-1} S^H \underline{r} = (M^{-1} R)\underline{x} + M^{-1} S^H \underline{n} \quad (6)$$

with: $M = R + \sigma^2/2I$ \quad (7)

where M is the modified crosscorrelation matrix for minimum mean squared error MMSE detection, based on R and the variance of the noise $\sigma^2$. I denotes the identity matrix. $E\{n\ n^H\} = \sigma\sigma^2/I$.

Finally, the estimated bit vectors for both detectors can be derived as follows:

$$\hat{x}_R = \text{sign}(Re(\underline{y})), \hat{x}_I = \text{sign}(Im(\underline{y})) \quad (8),(9)$$

For symbol-based iterative detection with successive cancellation, two order metrics are used: ordering dependent on the least mean-squared error (LMSE) for the first iteration, and ordering dependent on the log-likelihood ratios (LLR) from the decoder output in all following iterations. Details of these order metrics are as follows:

LMSE ordering (1st Iteration, Symbol-based):

For the matched filter detector, the LMSE order metric is equivalent to the ordering according to the highest received energy:

$$O_{MF}(k) = \max_k((R_R)_{k,k}) \quad (24)$$

Where k is the position of symbol of interest, and $(R_R)_{k,k}$ denotes the element at the kth row and kth column of the real part of the crosscorrelation matrix.

For the minimum mean squared error MMSE detector, the LMSE order metric which is also used for minimum mean squared error MMSE based BLAST detectors is:

$$O_{MMSE}(k) = \min_k((M_R^{-1})_{k,k}) \quad (25)$$

where $M_R^{-1}$ denotes the inversion of the real part of the modified crosscorrelation matrix for minimum mean squared error MMSE detection.

LLR ordering (Nth Iteration, Symbol-based):

When LLR values are available, they can be used for a more accurate order calculation. For symbol based detection, the order metric is dependent on all LLR values ($L_R$ and $L_I$) of each corresponding symbol j:

$$O_{LLR,symbol}(j) = \max_{j}(|L_{R,j}|+|L_{I,j}|) \qquad (25)$$

Bit-based Detectors

A preferred alternative to symbol cancellation is to detect and cancel the bits in each symbol separately. For this, an order metric is required which takes the transmitted bits into account and therefore makes it possible to detect and cancel each bit of the QPSK symbol separately, like the IEP ordering or the bit-based LLR ordering.

For bit-based detection, it is necessary to split up the received signal into contributions of each transmitted bit. Therefore, the separated received signal vectors $r_k$ at all receiver antennas can be written as:

$$\underline{r} = \begin{bmatrix} S & jS \end{bmatrix} \begin{bmatrix} \underline{x}_R \\ \underline{x}_I \end{bmatrix} + \underline{n} \qquad (10)$$

For a matched filter (MF) based successive cancellation process, ts separated soft outputs $y_{MF,R}$ and $y_{MF,I}$ are:

$$\begin{bmatrix} \underline{y}_{MF,R} \\ \underline{y}_{MF,I} \end{bmatrix} = \begin{bmatrix} S & jS \end{bmatrix}^H \underline{r} = R_R \underline{x} + \begin{bmatrix} S & jS \end{bmatrix}^H \underline{n} \qquad (11)$$

with: $R_R = Re([SjS]^H[SjS])$ (12)

When the successive cancellation process is based on minimum mean squared error MMSE detection, the separated soft outputs $y_{MMSE,R}$ and $y_{MMSE,I}$ are:

$$\begin{bmatrix} \underline{y}_{MMSE,R} \\ \underline{y}_{MMSE,I} \end{bmatrix} = M_R^{-1} \begin{bmatrix} S & jS \end{bmatrix}^H \underline{r} \qquad (13)$$

$$= (M_R^{-1} R_R)\underline{x} + M_R^{-1} + \begin{bmatrix} S & jS \end{bmatrix}^H \underline{n}$$

with: $M_R = R_R + \frac{\sigma^2}{2} I$ (14)

The estimated bit vectors for both detectors can be derived as follows:

$$\begin{bmatrix} \hat{\underline{x}}_R \\ \hat{\underline{x}}_I \end{bmatrix} = \text{sign}\left(Re\left(\begin{bmatrix} \underline{y}_R \\ \underline{y}_I \end{bmatrix}\right)\right) \qquad (15)$$

For bit-based iterative detection with successive cancellation, two order metrics are used: for the first iteration, the proposed bit-based order metric dependent on the instantaneous error probabilities (IEP) within each symbol period, and in all following iterations, ordering dependent on the log-likelihood ratios (LLR) from the decoder output. Details of these order metrics are as follows:

IEP Ordering (1st Iteration, Bit-based):

IEP order metrics take the transmitted bits of the interfering data streams into account to improve the detection and Cancellation order. With increasing crosscorrelations between the signatures the influence of the transmitted bits becomes more and more dominating. Therefore this order metric has a high potential in MIMO systems, where the data streams are highly correlated, because of the code reuse over all antennas. For the matched filter detector, the IEP order metric is:

$$O_{MF}(k) = \max_{k}\left(\frac{(R_R)_{k,k} - \left|\sum_{j \neq k}(R_R)_{k,j} b_j\right|}{\sqrt{(R_R)_{k,k}}}\right) \qquad (26)$$

where k is the position of the bit of interest, and j is the position of the interfering bit. The order metric selects the case, where the error probability for the bit of interest is minimal, assuming the worst case of the bit of interest, dependent on the sum of all interferences caused all interfering bits.

The IEP order metric for the minimum mean squared error MMSE detector is:

$$O_{MMSE}(k) = \max_{k}\left(\frac{(M_R^{-1} R_R)_{k,k} - \left|\sum_{j \neq k}(M_R^{-1} R_R)_{k,j} b_j\right|}{\sqrt{(M_R^{-1} R_R M_R^{-1})_{k,k}}}\right) \qquad (26)$$

LLR Ordering (Nth Iteration, Bit-based):

For bit-based detection and cancellation, the absolute value of the log likelihood ratios $L_i$ of each bit i can be used directly for ordering:

$$O_{LLR,bit}(i) = \max_{i}(|L_i|) \qquad (25)$$

Calculation of Soft Outputs for Decoding

The convolutional decoder 13 used is a max-log-MAP decoder, which requires soft inputs which are direct proportional to the log likelihood ratio. Therefore, in the case of a matched filter detector, real or imaginary parts of its outputs can be used directly as soft inputs for the decoder for the corresponding bits, since they are directly proportional to the log-likelihood ratio. For symbol detection and cancellation, the match filter soft outputs for quadrature phase shift keying QPSK modulation are:

$$\tilde{x}_{MF,R} = Re(\underline{y}), \tilde{x}_{MF,I} = Im(\underline{y}) \qquad (16),(17)$$

For bit detection and cancellation, the MF soft outputs for QPSK modulation are:

$$\tilde{x}_{MF,R} = Re(\underline{y}_R), \tilde{x}_{MF,I} = Re(\underline{y}_I) \qquad (18),(19)$$

When the detector is based on minimum mean squared error MMSE detection, the information regarding the received energy must be restored so that the minimum mean squared error MMSE output becomes directly proportional to the log-likelihood ratio. For symbol detection and cancellation, the MF soft outputs for QPSK modulation are:

$$\tilde{x}_{MMSE,R} = \text{Re}(\underline{y}) \frac{R_{k,j}}{(M^{-1}R)_{k,j}}, \tilde{x}_{MMSE,I} = \text{Im}(\underline{y}) \frac{R_{k,j}}{(M^{-1}R)_{k,j}} \quad (20), (21)$$

For bit detection and cancellation, the minimum mean squared error MMSE soft output vectors for QPSK modulation are:

$$\tilde{x}_{MMSE,R} = \text{Re}(\underline{y}_R) \frac{R_{k,j}}{(M^{-1}R)_{k,j}} \quad \tilde{x}_{MMSE,I} = \text{Re}(\underline{y}_I) \frac{R_{k,j}}{(M^{-1}R)_{k,j}} \quad (22), (23)$$

APP Detector

An a posteriori probability (APP) detector generates the log likelihood ratios of the received symbols. It performs an exhaustive search through the transmitted symbol candidates and determines the best vector that matches the received symbols. The APP detector can be used as the successive iterative cancellation SIC MIMO detector shown in FIGS. 1 and 2. A standard APP detector is used in the first iteration. In all consecutive iterations, the detector is combined with successive cancellation. It performs in each cancellation step an exhaustive search through the remaining symbol candidates. As order metrics, either the symbol-based LLR order, or the bit-based LLR order is applied.

Performance Comparison

The performance of symbol- and bit-based iterative detectors for MIMO, based on successive cancellation was evaluated. Detectors were compared in four versions, with different grade of complexity:

1. MF (1st iteration), MF+SIC (nth iteration)
2. MF+SIC (1st iteration), MF+SIC (nth iteration)
3. MMSE+SIC (1st iteration), MMSE+SIC (nth iteration)
4. APP (1st iteration), APP+SIC (nth iteration)

The bit-error rates (BER) of these detectors are compared after the first iteration (case a), and after 5 iterations (case b) i.e once their performance has converged.

Simulation Parameters

Figure 3:
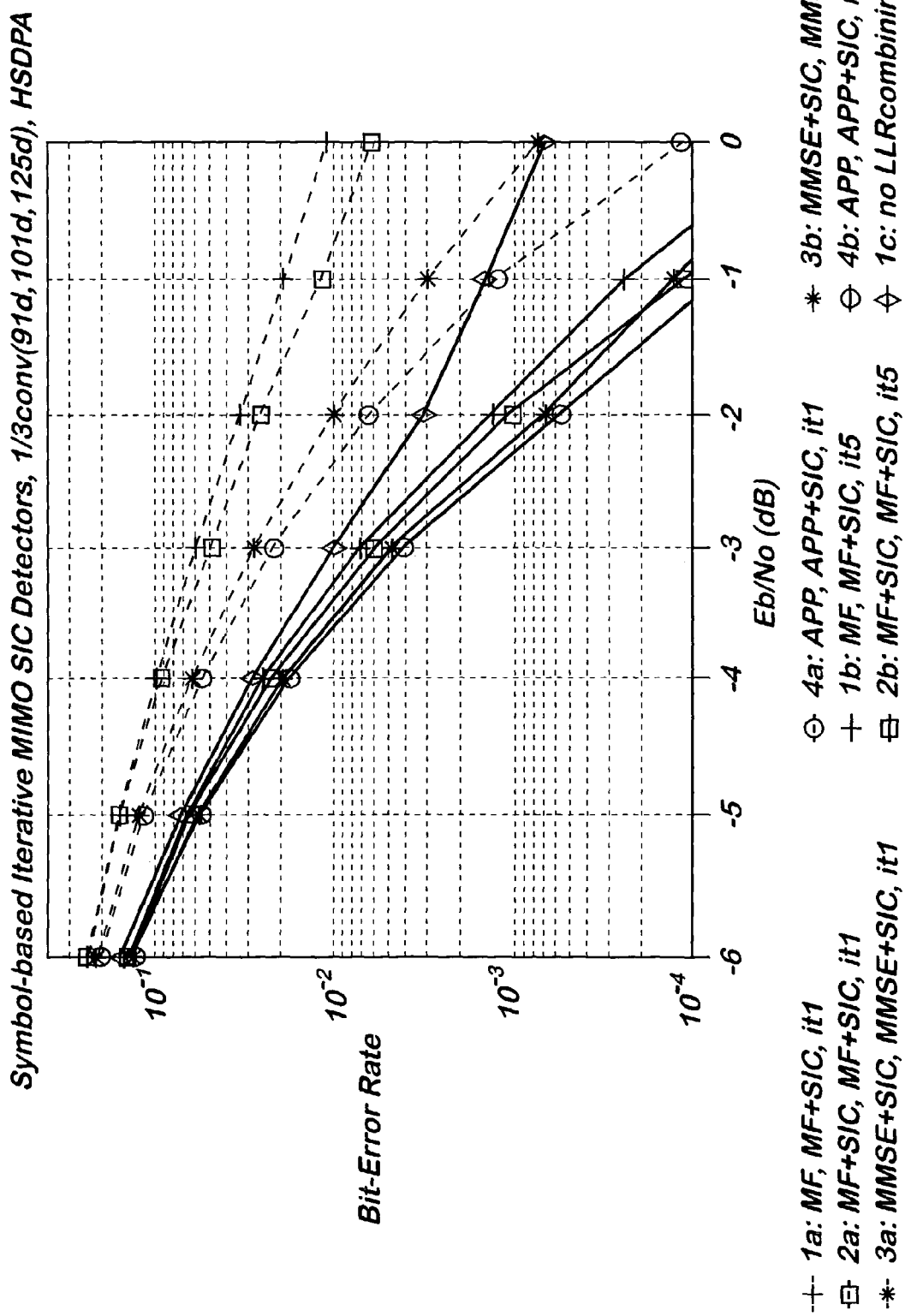
FIG. 3 is a graph of expected Bit error rates against bit energy/noise energy for various types of SIC MIMO detector using symbol based detection.
Figure 4:
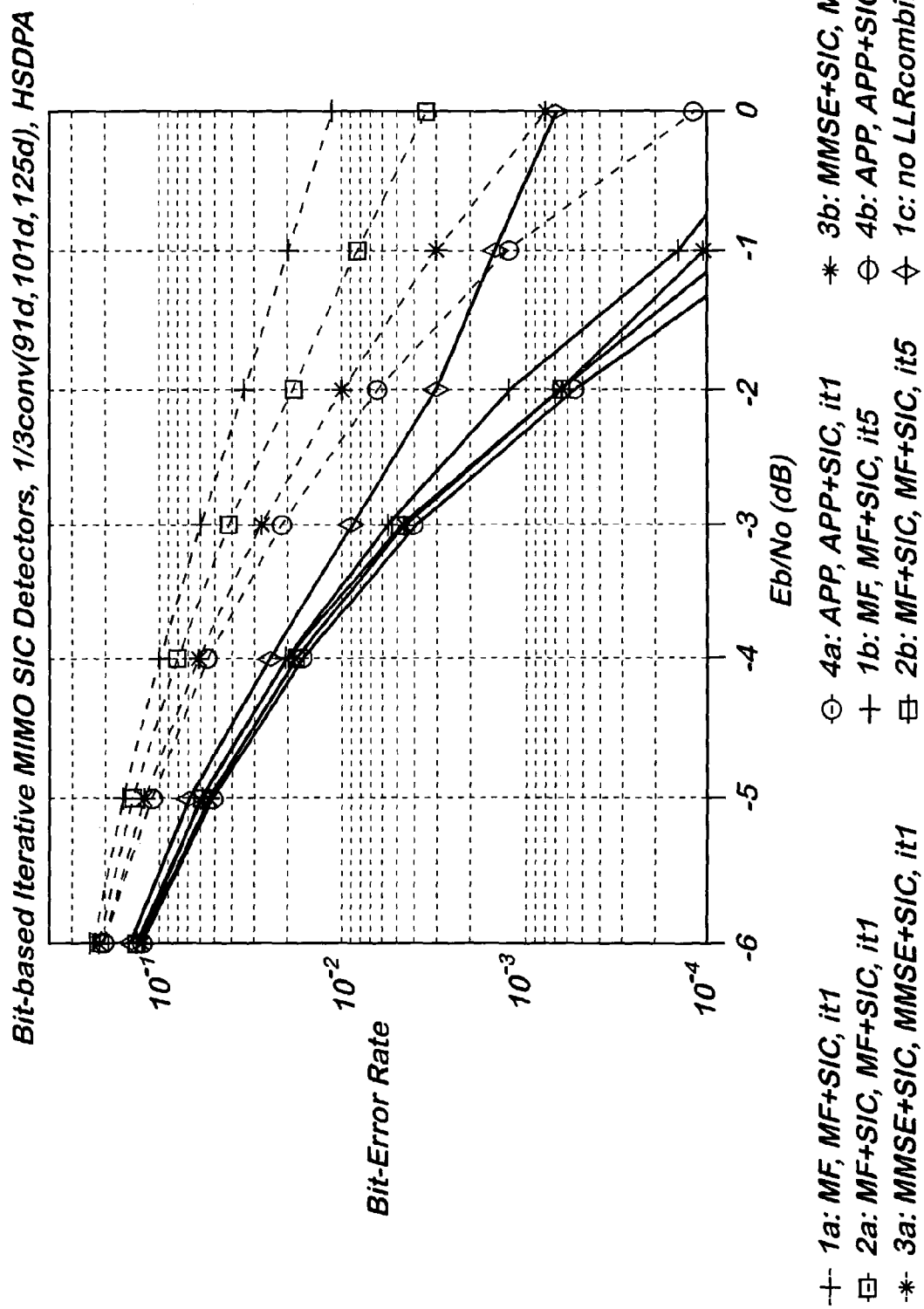
FIG. 4 is a graph of expected Bit error rates against bit energy/noise energy for various types of SIC MIMO detector using bit-based detection.

The simulation results presented in FIGS. 3 and 4 are based on a 4×4 antenna MIMO system. Each antenna transmits QPSK modulated symbols with equivalent spreading codes and a spreading factor of 16. The signals are transmitted trough a 1 tap uncorrelated Rayleigh fading channel assuming a mobile speed of 120 km/h. No power control is applied, and it is assumed that the receiver has knowledge of the channel. For coding, a convolutional code with 64 states and ⅓ rate is used. Interleaving is performed according to the HSDPA standard, with a block length of 4×7680 chips.

Performance of Symbol-based Detection

FIG. 3 shows the simulation result (Bit error rate BER against the ratio of bit energy over energy of noise Eb/No) for symbol-based iterative detectors, after the first (1a . . . 4a), after 5 iterations (1b . . . 4b) and one case without LLR combining (1c). After the first iteration the difference in performance of the different detection algorithms is significant. However, after 5 iterations even the detector based on only a bank of matched filters offers very good performance, and the distance to the more complex detectors shrinks significantly. The Iterative APP detector offers the best performance at the cost of high complexity. The poor BER results of line 2c (compared to 2b) shows the importance of LLR combining.

Performance of Bit-based Detection

FIG. 4 shows the simulation result for bit-based iterative detectors, after the first (1a . . . 4a) and after 5 iterations (1b . . . 4b) and one case without LLR combining (1c). In comparison to symbol-based detection, the performance can be further improved by bit-based detection. Combining bit-based detection with the IEP order metric in the first iteration enables the successive cancelling MF detector to achieve the same performance as the successive cancelling minimum mean squared error MMSE detector at much lower complexity. Again, the successive cancelling APP detector offers the best results, but performs only slightly better than the successive cancelling MF detector. In comparison to symbol-based detection, bit-based detection improves the BER results of all detectors.

To recap, the performance of SIC MIMO detectors is dependent on the performance of the first iteration, and the detector type. It was shown, that bit-based detection outperforms symbol-based detection. It was also shown, that iterative detectors with very low complexity, based only on a bank of matched filters in the first iteration, and matched filters with successive cancellation in the following iterations, are capable of achieving impressive performance. Additionally, the recently proposed IEP order metric, based on the instantaneous error probabilities within each symbol period, was extended for QPSK and used to improve the first iteration, and therefore the system performance in a MIMO detector based on successive interference cancellation. This enabled the iterative MF SIC detector to reach the same performance as the iterative minimum mean squared error MMSE SIC detector, which leads to a significant reduction of complexity. The best performance was achieved by the iterative APP SIC detector, but with high complexity. Results were achieved by using the proposed method of LLR combining, which stabilizes the LLR outputs.

Other Types of Iterative Detectors

The LLRs mentioned above are but one type of soft estimates of symbols or bits (so-called soft estimates). Soft estimate combining can be applied to many different iterative systems consisting of detectors or decoders. By way of further example an iterative decoder of parallel-concatenated codes, i.e a turbo decoder, is shown in FIG. 5.

Figure 5:
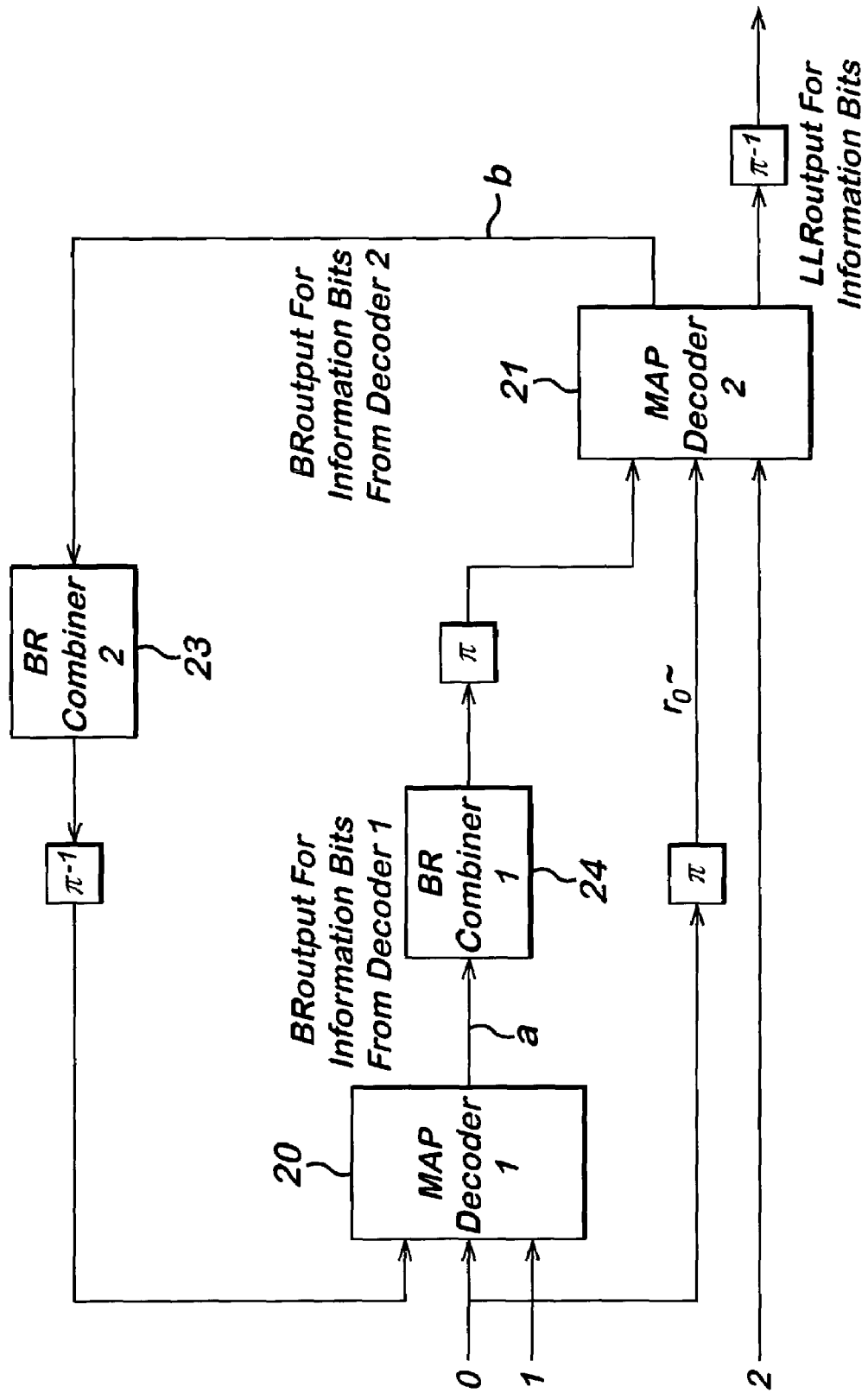
FIG. 5 is a turbo decoder according to the present invention in a further embodiment.

In the FIG. 5 system, the iterative loop contains two points a,b, namely at the output port of each decoder 20, 21 where reliable estimates are produced. Here, the soft value combining is applied to generate more reliable soft values based on the knowledge of the previous iteration in the two combiners 23,24.

An alternative to the option shown in FIG. 5 is, as shown in FIG. 6, to use only a single soft value combiner 23' and update it alternately from the first decoder 20' and then the second decoder 21' and then the first decoder 20' and so on. This is possible, because both decoders 20', 21' improve the soft estimates of the same information bits.

As shown in FIGS. 5 (and 6), since the soft information exchange in the turbo decoder is done with extrinsic information (EIR values), they are used for the combining instead of the LLR values, which were used for the information exchange between the convolutional decoder and the MIMO detector in the iterative receiver shown in FIG. 2.

Some further embodiments (which are not shown) involve iterative decoding of serial concatenated codes.

We claim:

1. A radio telecommunications receiver operative to receive symbols or bits by iterative determination of soft estimates of symbols or bits followed by a hard decision as to what symbol or bit was intended, the receiver comprising:
   a first processor operative to provide first soft estimates of symbols or bits of the received signal, the first processor being a successive interference cancellation (SIC) multiple input multiple output (MIMO) detector;
   a second processor operative to decode the first soft estimates and to provide second soft estimates of the symbols or bits;
   a combiner operative to provide third soft estimates back to the first processor for subsequent further decoding, the third soft estimates of each symbol or bit being dependent upon the respective second soft estimate and a respective previous second soft estimate;
   a deinterleaver operative to deinterleave the first soft estimates from the SIC MIMO detector before the first soft estimates are passed to the second processor; and
   an interleaver operative to interleave the third soft estimates provided by the combiner before the third soft estimates are passed back to the SIC MIMO detector.

2. The receiver of claim 1, wherein, a plurality of iterations each involving the first processor, second processor and combiner are performed whereupon a hard decision is made as to what symbol or bit was intended.

3. The receiver of claim 1, wherein,
   the second processor is a convolutional decoder, turbo-decoder, or decoder of concatenated codes; and
   the soft estimates are log likelihood ratios.

4. The receiver of claim 3, wherein, the SIC MIMO detector undertakes detection on a per-bit basis by successive interference cancellation.

5. The receiver of claim 1, wherein, the first processor is a convolutional decoder, turbo-decoder, or decoder of concatenated codes;
   the second processor is a convolutional decoder, turbo-decoder, or decoder of concatenated codes; and
   the soft estimates are extrinsic information values.

6. The receiver of claim 1, further comprising:
   a second combiner operative to provide adapted first soft estimates to the second processor, the adapted first soft estimates of each symbol being dependent upon the respective first soft estimate and a respective previous first soft estimate.

7. The receiver of claim 1, wherein, the combiner is also operative to provide adapted first soft estimates to the second processor, the adapted first soft estimates of each symbol or bit being dependent upon the respective first soft estimate and respective previous first soft estimate.

8. A method of receiving symbols or bits in a radio telecommunications receiver by iterative determination of soft estimates of symbols or bits followed by a hard decision as to what symbol or bit was intended, the method comprising the steps of:
   processing the received signal using a successive interference cancellation (SIC) multiple input multiple output (MIMO) detector to provide first soft estimates of symbols or bits of the received signal,
   decoding the first soft estimates to provide second soft estimates of the symbols or bits,
   deinterleaving the first soft estimates from the SIC MIMO detector before the first soft estimates are decoded to provide the second soft estimates;
   producing third soft estimates dependent upon the second soft estimate and a previous second soft estimate of each symbol or bit;
   providing the third soft estimates back to the SIC MIMO detector for subsequent further decoding; and
   interleaving the third soft estimates before the third soft estimates are provided back to the SIC MIMO detector.

* * * * *